(12) United States Patent
Haufe

(10) Patent No.: US 12,706,513 B2
(45) Date of Patent: Aug. 11, 2026

(54) INSTALLATION ASSEMBLY, METHOD FOR PRODUCING AN INSTALLATION ASSEMBLY, AND ELECTRONICALLY COMMUTATED MOTOR HAVING AN INSTALLATION ASSEMBLY

(71) Applicant: Robert Bosch GmbH, Stuttgart (DE)

(72) Inventor: Benjamin Haufe, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 18/834,846

(22) PCT Filed: Mar. 6, 2023

(86) PCT No.: PCT/EP2023/055526
§ 371 (c)(1),
(2) Date: Jul. 31, 2024

(87) PCT Pub. No.: WO2023/217432
PCT Pub. Date: Nov. 16, 2023

(65) Prior Publication Data

US 2025/0141327 A1 May 1, 2025

(30) Foreign Application Priority Data

May 12, 2022 (DE) ..................... 10 2022 204 652.8

(51) Int. Cl.
*H02K 29/08* (2006.01)
*H02K 5/173* (2006.01)
(Continued)

(52) U.S. Cl.
CPC ........... *H02K 29/08* (2013.01); *H02K 5/1735* (2013.01); *H02K 11/215* (2016.01); *H02K 15/40* (2025.01)

(58) Field of Classification Search
CPC .... H02K 11/215; H02K 29/08; H02K 5/1732; H02K 5/1735; H02K 15/40; F16C 35/063
See application file for complete search history.

(56) References Cited

U.S. PATENT DOCUMENTS 7,109,615 B2 * 9/2006 Doemen ............. H02K 5/1732 310/90
7,153,031 B2 12/2006 Jones
(Continued)

FOREIGN PATENT DOCUMENTS

CN 108462333 A 8/2018
DE 102020204831 A1 10/2021
(Continued)

OTHER PUBLICATIONS

International Search Report for PCT/EP2023/055526, Issued Jun. 12, 2023.

*Primary Examiner* — Leda T Pham
(74) *Attorney, Agent, or Firm* — Norton Rose Fulbright US LLP

(57) ABSTRACT

An installation assembly. In installation assembly includes a machine shaft, a second rolling bearing having an inner ring and and an outer ring, for rotatably bearing the machine shaft in a housing block, and a signal transmitter of a rotor position sensor having a transmitter element and a cup-shaped holder for electrical detection of an angle of rotation of the machine shaft. Between a fixing portion of the cup-shaped holder and the circumference of the machine shaft there is an annular gap in which a fastening ring is inserted, using which the signal transmitter is rotationally and axially fastened to the machine shaft. One of the ends of the fastening ring protrudes axially out of the cup-shaped holder and is supported axially on the inner ring of the rolling bearing by this protruding end. A method for install-
(Continued)

ing an installation assembly, and an electrically commutated motor, are also described.

8 Claims, 6 Drawing Sheets

(51) Int. Cl.
*H02K 11/215* (2016.01)
*H02K 15/40* (2025.01)

(56) References Cited

U.S. PATENT DOCUMENTS

| | | | | |
|---|---|---|---|---|
| 7,610,671 | B2 | 11/2009 | Watkins et al. | |
| 12,420,762 | B2 * | 9/2025 | Jerchen | G01D 5/145 |
| 2020/0030987 | A1 | 1/2020 | Diankov | |
| 2022/0375669 | A1 * | 11/2022 | Taniguchi | H01F 7/021 |

FOREIGN PATENT DOCUMENTS

| | | | |
|---|---|---|---|
| DE | 102020212192 | A1 | 3/2022 |
| JP | H0652362 | A | 2/1994 |
| JP | 2009522988 | A | 6/2009 |
| JP | 2017034779 | A | 2/2017 |
| JP | 2021160673 | A | 10/2021 |

* cited by examiner 18
12
14
32
34
30
22
22
26
24
20
16
46
50
10
36
52
42
48
40
28
38
44

INSTALLATION ASSEMBLY, METHOD FOR PRODUCING AN INSTALLATION ASSEMBLY, AND ELECTRONICALLY COMMUTATED MOTOR HAVING AN INSTALLATION ASSEMBLY

FIELD

The present invention relates to an installation assembly, a method for producing an installation assembly, and an electronically commutated motor.

BACKGROUND INFORMATION

Installation assemblies of the same type are described in the related art. For example, German Patent Application No. DE 10 2020 204 831 A1 describes an electronically commutated machine with such an installation assembly, which is provided as a drive unit for a brake pressure generator of an electronically slip-controllable brake system of a motor vehicle.

In this conventional machine, a signal transmitter is anchored to one of the ends of a machine shaft in a rotationally fixed manner. The signal transmitter, which rotates with the machine shaft, together with a signal receiver arranged in a stationary manner on a housing block, forms a sensor system for detecting the rotary position of the machine shaft. The position signal is forwarded to an electronic control unit and evaluated there. For example, this position signal can be used for demand-optimized electrical control of a stator of the electrical machine and/or to determine an actuation path of a piston of a pressure generator driven by the machine shaft, possibly via a downstream transmission. The distance traveled by the piston can be used to determine the volume of brake fluid displaced in a connected brake circuit and, from this, the braking pressure to be expected in the brake circuit can be ascertained.

German Patent Application No. DE 10 2020 204 831 A1 describes a non-positive shaft-hub connection using a fastening ring or tolerance ring to provide a rotationally fixed and axially fixed connection between the signal transmitter and the machine shaft. This tolerance ring is located in an annular gap between the outer circumference of the machine shaft and an inner circumference of a cup-shaped holder of the signal transmitter pushed onto the machine shaft. The cup-shaped holder carries a magnet as a transmitter element.

SUMMARY

The present invention further develops this conventional assembly group by additionally using the tolerance ring to axially pretension the bearing rings of a rolling bearing, provided to support the machine shaft, against each other. For this purpose, according to an example embodiment of the present invention, the fastening ring or tolerance ring protrudes axially with one of the ends from a fastening portion of the cup-shaped holder of the signal transmitter and is supported with this protruding end on the inner ring of the rolling bearing. The tensioning force of the rolling bearing is provided by a spring element, which is arranged on the opposite side of the rolling bearing and loads the associated outer ring of the rolling bearing.

Due to the support provided for the fastening ring or tolerance ring on the inner ring of the rolling bearing, axial support of the fastening ring or tolerance ring for the purpose of preventing movement relative to the machine shaft can be dispensed with when installing the signal transmitter. The latter is particularly advantageous if the available installation space makes it difficult or even impossible to use a support tool, as is usually the case with components for motor vehicles. The joining of the signal transmitter can be concealed, i.e., without measures for monitoring such undesirable relative movement between the tolerance ring and the machine shaft. When installed, the rolling bearing is fixed between the fastening ring or tolerance ring and a shaft shoulder provided on the machine shaft in the shaft longitudinal axis direction, i.e., it is fixed axially. Additional components, such as lock rings, are no longer necessary for this purpose.

Further advantages or advantageous developments of the present invention are disclosed herein.

BRIEF DESCRIPTION OF THE DRAWINGS

An embodiment example of the present invention is shown in the figures and explained in greater detail in the description below.

DETAILED DESCRIPTION OF EXAMPLE EMBODIMENTS

Figure 1:
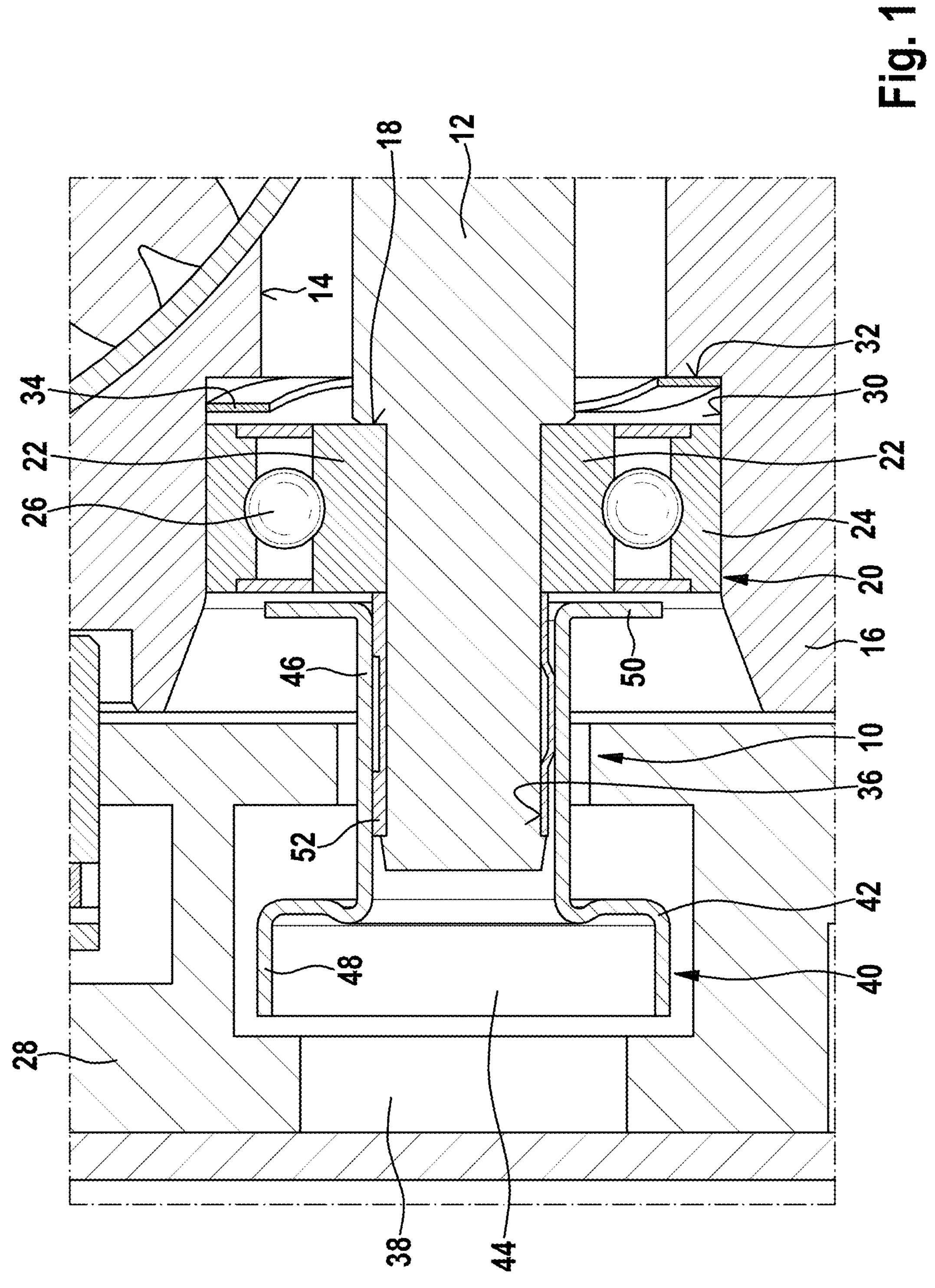
FIG. 1 shows the installation assembly in longitudinal section, according to an example embodiment of the present invention.

According to FIG. 1, an installation assembly (10) according to the present invention comprises a machine shaft (12) which is rotatably mounted in a shaft bore (14) of a housing block (16). The bearing is provided by at least two rolling bearings, of which FIG. 1 shows only one, the so-called second rolling bearing (20). This second rolling bearing (20) is designed for example, as a ball bearing sealed on both sides and has an inner ring (22), an outer ring (24) and balls (26) accommodated between the rings in track portions. The second rolling bearing (20) is arranged in a cylindrical portion of a bearing receptacle (30) of the housing block (16), which opens conically towards the end of the machine shaft (12). An electronic control unit (28) is attached to the housing block (16), into which the end of the machine shaft (12) extends. A signal receiver (38) is stationarily arranged in the electronic control unit (28) opposite the opening of the shaft bore (14).

On a side located opposite the opening, the bearing receptacle (30) ends in a support shoulder (32) designed perpendicularly to the shaft longitudinal axis. This support shoulder (32) serves as a first axial support for a spring element (34), which is designed as a wave spring washer, for example. The side flank of the outer ring (24) of the second rolling bearing (20) forms a second axial support for the spring element (34). In the fully installed state, the spring element (34) is arranged under axial pretension between the two supports described above.

The machine shaft (12) is perpendicularly graduated once in its outer diameter and accordingly forms a shaft shoulder (18). A first shaft portion with a smaller outer diameter is formed at the end of the machine shaft (12). A second shaft diameter with a larger outer diameter penetrates the annular spring element (34) and extends further into the shaft bore (14). The second rolling bearing (20) is accommodated with the inner diameter of its inner ring (22) on the first shaft portion having a smaller diameter. This second rolling bearing (20) lies with the side flank of its inner ring (22) against the shaft shoulder (18). There is a clearance fit between the inner diameter of the inner ring (22) of the second rolling bearing (20) and the outer diameter of the machine shaft (12), as well as between the outer diameter of the outer ring (24) of the second rolling bearing (20) and the inner diameter of the bearing receptacle (30). The second rolling bearing (20) is thus arranged in the bearing receptacle (30) so that it can be shifted relative to the machine shaft (12) and to the housing block (16).

The machine shaft (12) protrudes from the second rolling bearing (20) with its first shaft portion, which is smaller in diameter, in the direction of the opening of the shaft bore (14). This protruding shaft portion of the machine shaft (12) forms a fastening portion (36) for a signal transmitter (40) anchored to the machine shaft (12). To this end, the signal transmitter (40) comprises a sleeve-shaped cup-shaped holder (42) projecting beyond the end of the machine shaft and a magnet (44) supported by the cup-shaped holder (42) as a transmitter element. The signal transmitter (40) interacts with the signal receiver (38) in the electronic control unit (28) and forms a sensor system for detecting an angle of rotation of the machine shaft (12).

The cup-shaped holder (42) of the signal transmitter (40) is a sleeve-shaped component, open on both sides, which is divided into a fixing portion (46) at the front end on the roller bearing side and a transmitter receptacle (48) for the magnet (44) at the opposite front end of the cup-shaped holder (42) on the control unit side. In the region of the fixing portion (46), the cup-shaped holder (42) has a smaller inner diameter than in the region of the transmitter receptacle (48), so that the magnet (44) supported by the transmitter receptacle (48) protrudes radially beyond the front face of the machine shaft (12). The magnet (44) is located directly opposite the signal receiver (38) in the electronic control unit (38).

At the end on the rolling bearing side, a circumferential press-fit collar (50) protruding outwards perpendicularly from the cup-shaped holder (42) is formed on the fixing portion (36) of the cup-shaped holder (42). In the end position of the cup-shaped holder (42) shown, there is a predetermined axial distance between this press-fit collar (50) and the facing side flank of the second rolling bearing (20), i.e., the cup-shaped holder (42) and the second rolling bearing (20) do not touch one another.

The signal transmitter (40) is anchored to the machine shaft (12) by means of a fastening ring (52). This fastening ring (52) lies in an annular gap between the outer diameter of the first shaft portion of the machine shaft (12), said machine shaft portion being smaller in diameter, and an inner diameter of the fixing portion (46) of the cup-shaped holder (42). Fastening rings (52) are also known as tolerance rings and are available as closed rings or as open or slotted rings.

According to the present invention, the fastening ring (52) protrudes axially from the fixing portion (46) of the cup-shaped holder (42) with its end facing the second rolling bearing (20) and is supported axially on the side flank of the inner ring (22) of the second rolling bearing (20).

By shaping the track portions for the rolling elements/balls (26) on both the inner ring (22) and the outer ring (24) of the second rolling bearing (20), the two bearing rings are coupled to each other via the balls (26) in a form-locking manner and are axially displaceable due to a bearing clearance that is unavoidable as a result of the manufacturing process. The spring element (34) applies a preload force to the outer ring (24) of the rolling bearing (20) and, as a result, braces the two bearing rings of the rolling bearing (20) against each other. A machine shaft (12) having a braced bearing in a housing block (16) ensures particularly low-noise and wear-resistant operation of a machine equipped with it.

When manufacturing the installation unit, a support tool that secures the position of the fastening ring or tolerance ring (52) on the machine shaft (12) when installing the signal transmitter (40) can be dispensed with. The cup-shaped holder (42) of the signal transmitter (40) can be pushed onto the fastening ring (52) in a concealed manner, as no relative movement in the axial direction or shaft longitudinal axis direction between the fastening ring (52) and the machine shaft (12) is possible due to the axial abutment of this fastening ring (52) with the inner ring (22) of the second rolling bearing (20).

FIGS. 2A-2I, and 2K illustrate the production of an electric motor equipped with an installation assembly (10) according to the present invention. The individual figures, FIGS. 2A-2I, and 2K schematically show the individual, successive installation steps in simplified form. Corresponding components in FIG. 1 and in FIGS. 2A-2I, and 2K are marked throughout with uniform reference symbols.

Figure 2A:
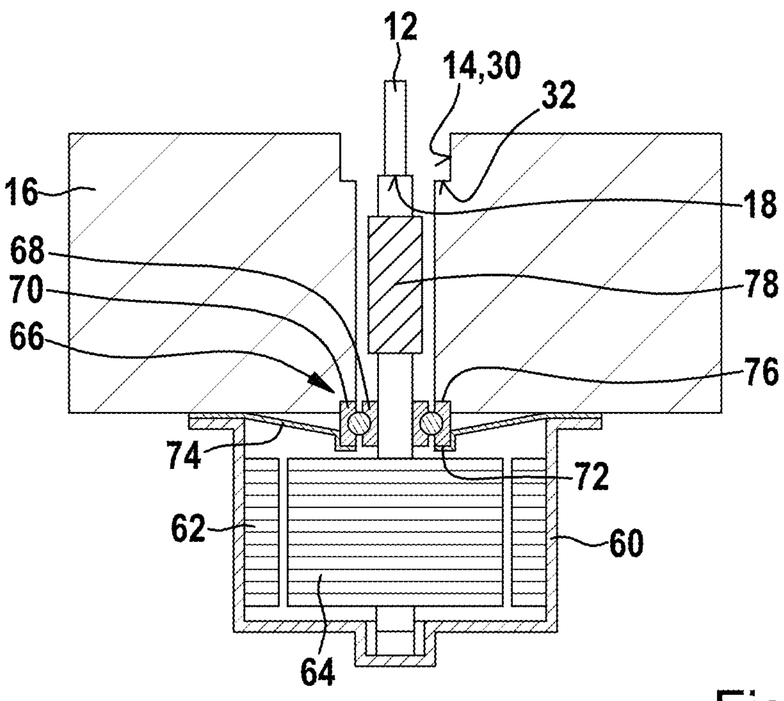
FIGS. 2A-2I, and 2K illustrate the method for producing this installation assembly using the successive process steps, according to an example embodiment of the present invention.

FIG. 2A shows the initial state at the start of the installation process. In this initial state, a housing block (16) is provided, on which a shaft bore (14) penetrating this housing block (16) is formed. An electrical machine, in the example an electric motor, having a stator housing (60) is attached to one of the outer sides of this housing block (16), for example by means of screw connections (not shown). The stator housing (60) accommodates a stator (62) and a rotor (64) rotatably mounted inside this stator (62). This rotor (64) is firmly connected to the machine shaft (12), which extends into the shaft bore (14). On the side opposite the rotor, the machine shaft (12) protrudes out of the housing block (16). This side of the housing block (16) is provided for mounting an electronic control unit (item 28; FIG. 1).

A first rolling bearing or ball bearing (66) is provided for rotatably bearing the machine shaft (12) or the rotor (64) firmly connected to said machine shaft (12) in the housing block (16). An inner ring (68) of this first rolling bearing (66) is firmly pressed onto the machine shaft (12), while an outer ring (70) of the first rolling bearing (66) is firmly pressed with a portion of its end facing the rotor (64) circumferentially into a first bearing seat (72) on a housing cover (74), which covers the stator housing (60), and with a portion of its end facing away from the rotor (64) also circumferentially into a second bearing seat (76) on the outer side of the housing block (16).

A portion of the machine shaft (12) located inside the shaft bore (14) is fitted with an output element (78). This can be a spindle nut, a gear wheel, an eccentric, cam or the like. The output element (78) and the machine shaft (12) can be manufactured in one piece or alternatively as individual parts that are firmly connected to one another.

The end of the shaft bore (14) of the machine housing opposite the stator housing (60) has a support shoulder (32) pointing towards the opening of this shaft bore (14).

Figure 2B:
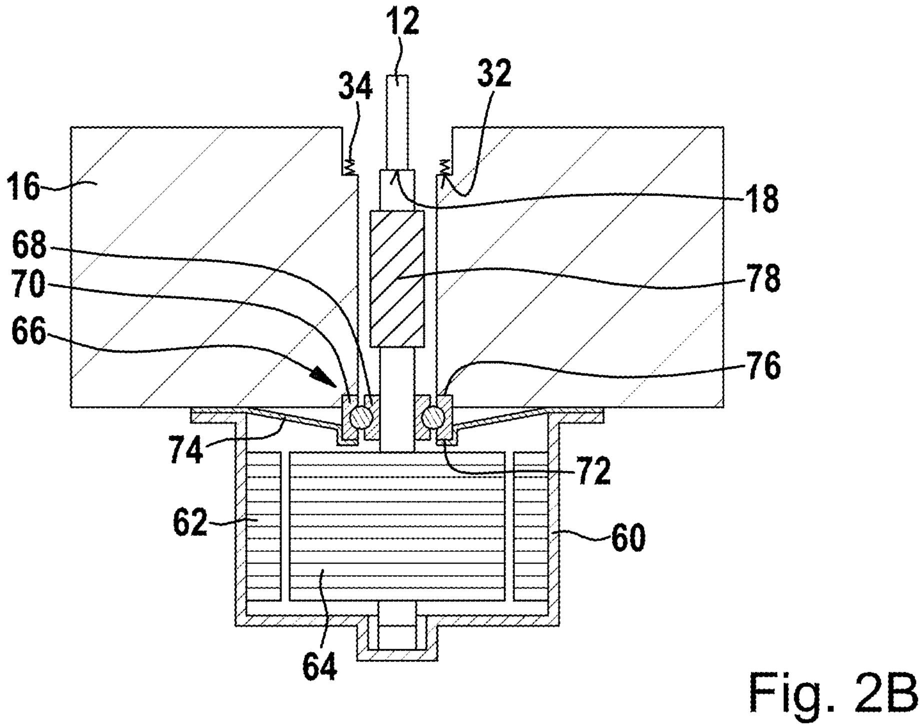

According to FIG. 2B, the annular spring element (34) surrounding the machine shaft (12) has been inserted into the shaft bore (14). In the installed state, this spring element (34) rests on the support shoulder (32) formed inside the shaft bore (14).

Figure 2C:
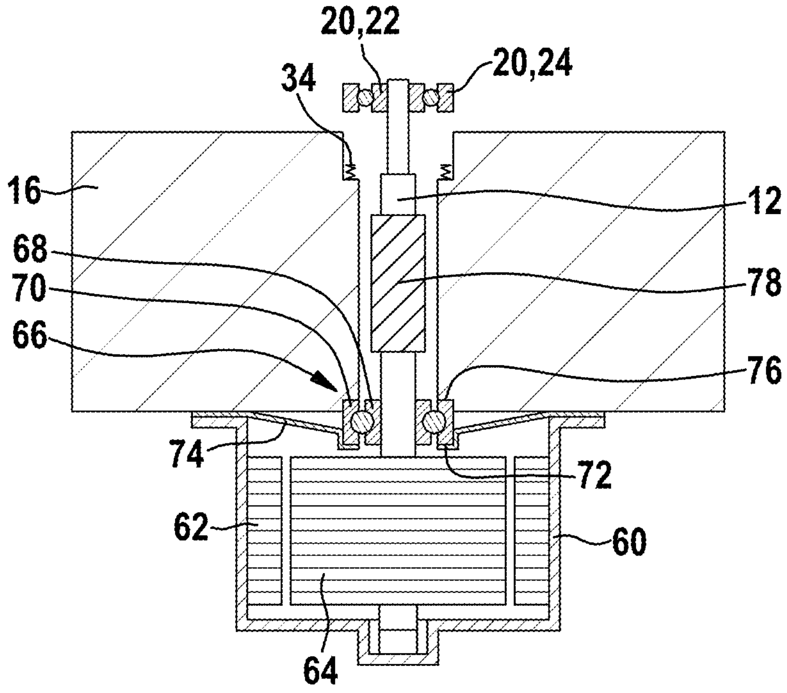
Figure 2D:
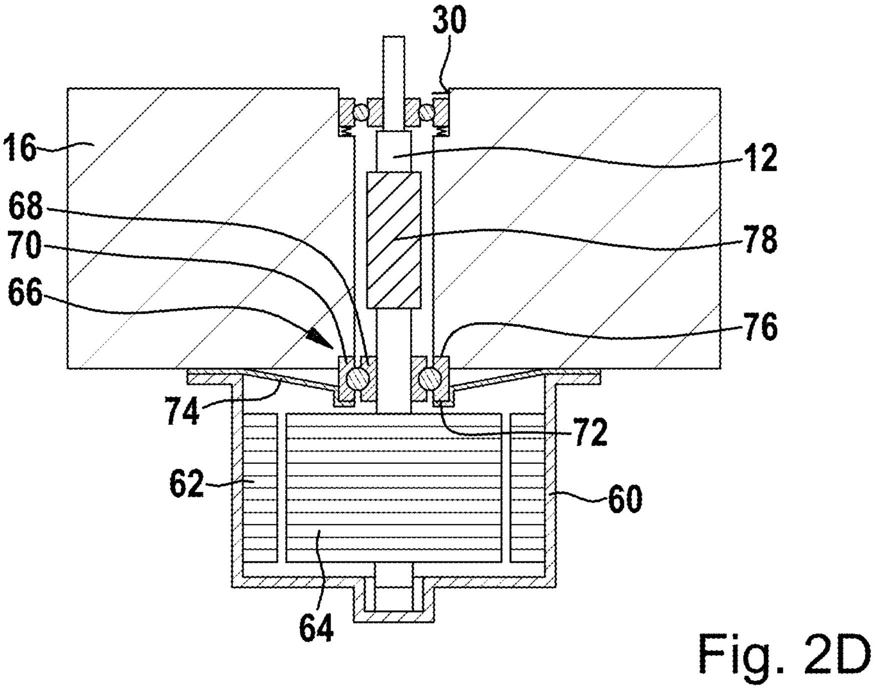

FIG. 2C shows the second rolling bearing or ball bearing (20), which has been pushed onto the machine shaft (12) with its inner ring (22) until it rests on the spring element (32) with the leading side flank of its outer ring (24) as shown in FIG. 2D. On the circumferential side, the second rolling bearing (20) rests against the wall of the bearing receptacle (30). FIGS. 2C, 2D do not show a first clearance fit between the inner ring (22) of the second rolling bearing (20) and the machine shaft (12) or a second clearance fit between the outer ring (24) of the second rolling bearing (20) and the wall of the bearing receptacle (30).

Figure 2E:
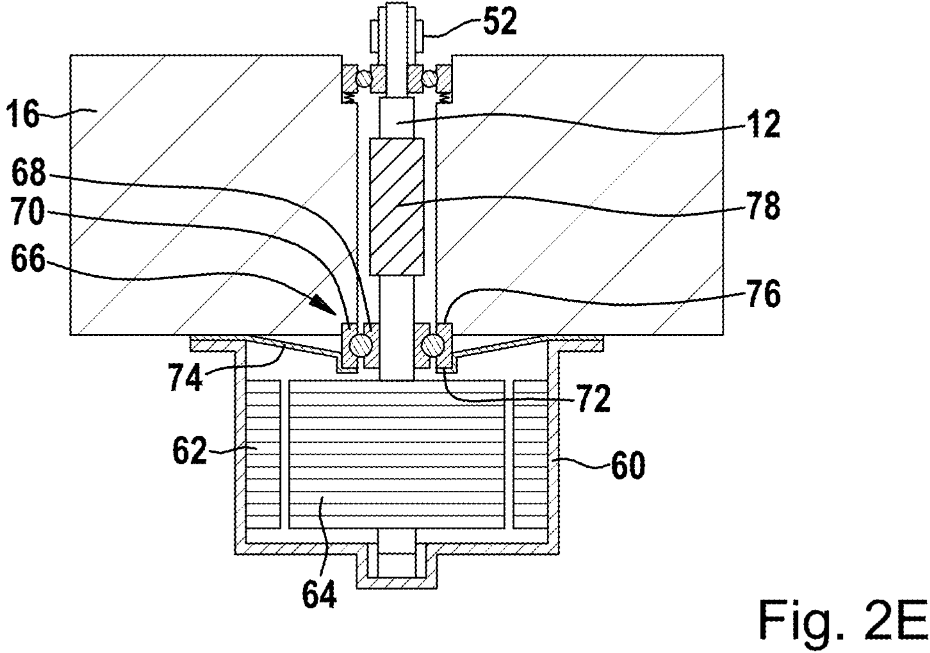

In the step according to FIG. 2E, the fastening ring or tolerance ring (52) is installed on the machine shaft (12). First, this fastening ring (52) is threaded onto the free end of the machine shaft (12) and then moved along the shaft circumference until one leading end touches the inner ring (22) of the second rolling bearing (20). This requires little axial force to be applied in the direction of the shaft longitudinal axis because a fit between the fastening ring (52) and the machine shaft (12) is designed as a clearance fit or transition fit.

Figure 2F:
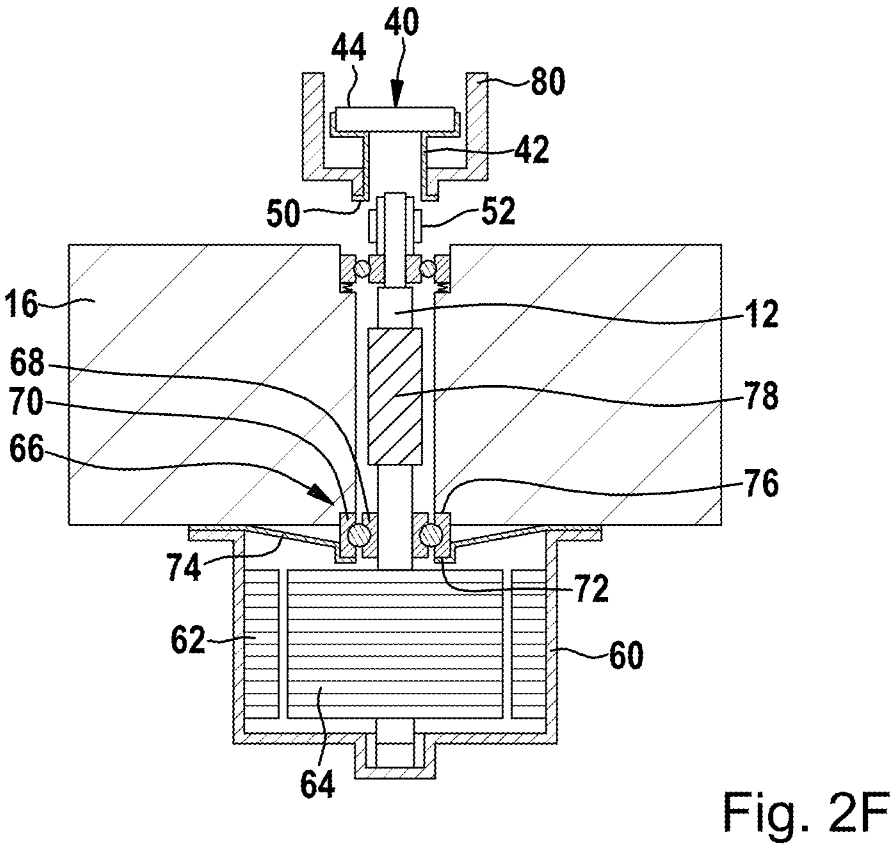
Figure 2G:
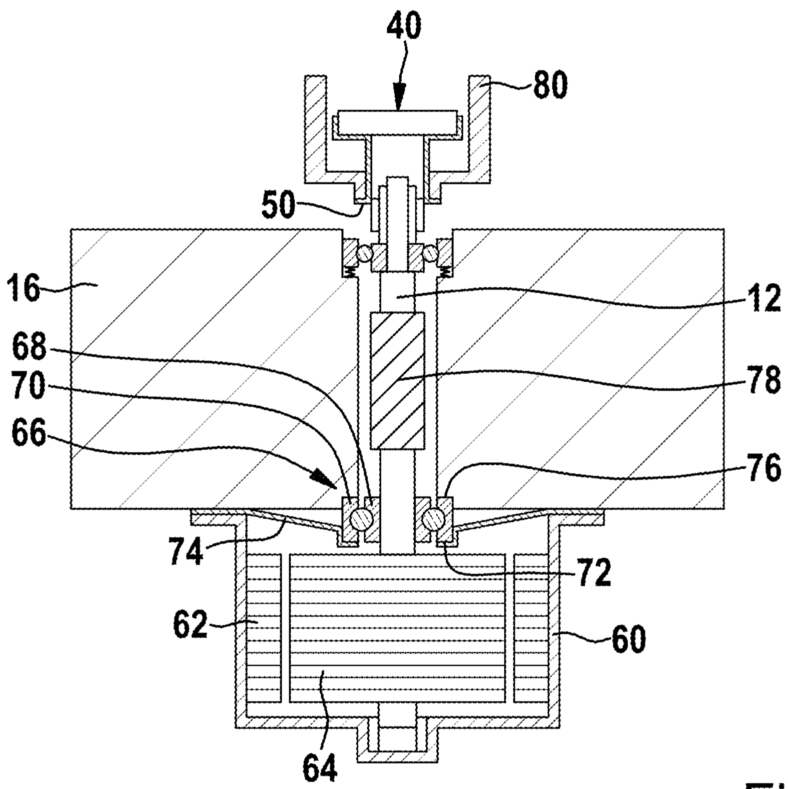

According to FIG. 2F, a magnet (44) of the signal transmitter (40) is then inserted into the transmitter receptacle (48) of the cup-shaped holder (42) provided for this purpose and fastened, for example by gluing or caulking it to the cup-shaped holder (42). This pre-installed unit consisting of cup-shaped holder (42) and magnet (44) is then centered on the outer circumference of the fastening ring (52) and pressed onto the fastening ring or tolerance ring (52), at least in sections, using a press-on tool (80) (FIG. 2G). The press-on tool (80) engages on the rear side of the press-fit collar (50) protruding radially from the cup-shaped holder (42) when viewed in the press-fit direction.

Figure 2H:
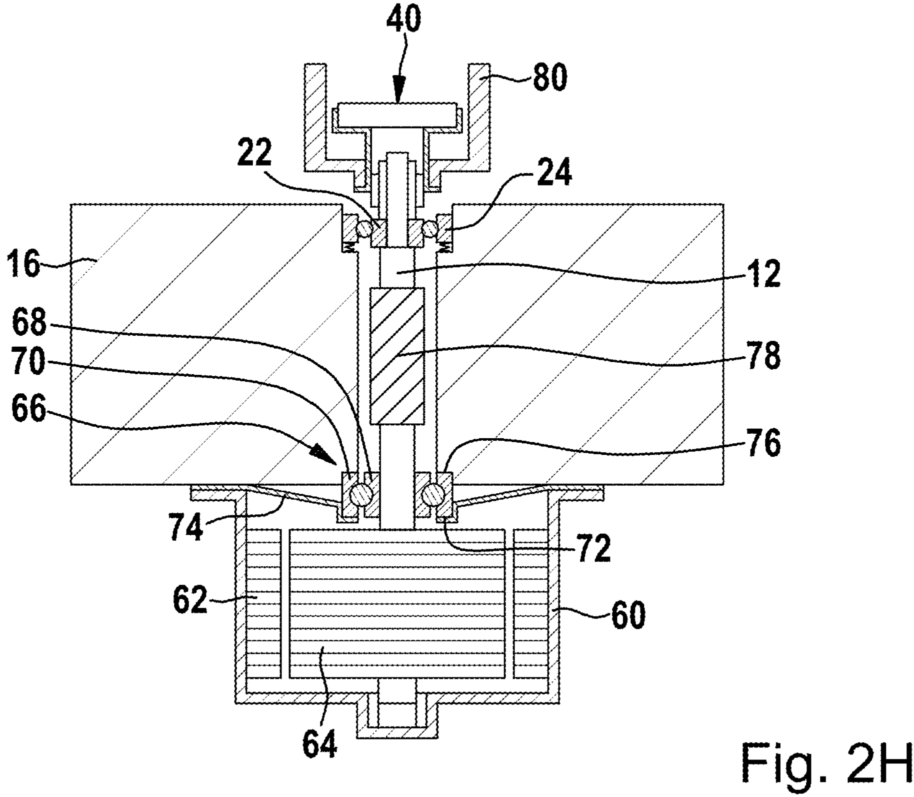

As the cup-shaped holder (42) begins to overlap the fastening ring (52), the press-on forces increase, and the spring element (34) located between the support shoulder (32) of the housing block (16) and the outer ring (24) of the second rolling bearing (20) is pretensioned, as the fastening ring (52) executes a movement relative to the machine shaft (12) that is directed into the interior of the shaft bore (14) due to the press-on forces, thus propelling the abutting second rolling bearing (20) in front of it. With the mechanical abutment of a side flank of the inner ring (22) of this second rolling bearing (20) with the shaft shoulder (18) of the machine shaft (12), the second rolling bearing (20) has reached its end position (FIG. 2H).

Figure 2I:
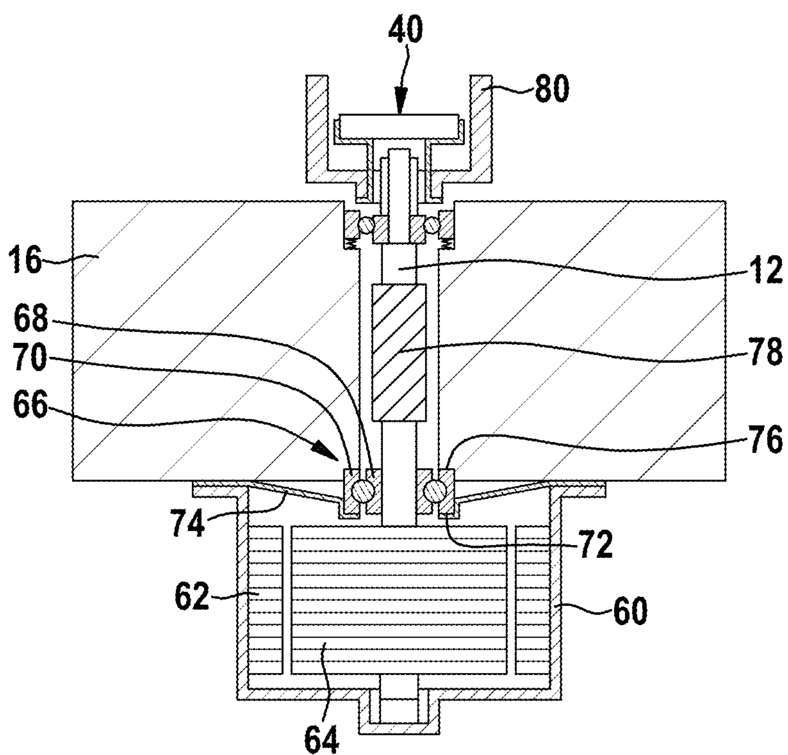

The unit consisting of cup-shaped holder (42) and magnet (44) is now, according to FIG. 2I, moved further relative to the fastening ring (52) by the press-on forces, which continue to act unchanged, until a maximum overlap is reached between this cup-shaped holder (42) and the fastening ring (52). This ends the press-on process of the signal transmitter (40). The fastening ring (52) is now radially pretensioned by the cup-shaped holder (42) and firmly anchored on the machine shaft (12) due to this pretension.

When the signal transmitter (40) is pressed onto the fastening ring (52), the press-on forces act on the inner ring (22) of the second rolling bearing (20) via the fastening ring (52). The associated outer ring (24) of this second rolling bearing (20) is subjected to force in the opposite axial direction by the spring element (34) supported on the support shoulder (32) of the housing block (16). These forces acting in opposite directions on the respective bearing rings of the second rolling bearing (20) brace the bearing rings against each other, whereby an originally existing bearing clearance, that is, the clearance of the rolling elements or ball bearings (26) in their track portions on the inner ring (22) or outer ring (24), is reduced at least approximately to zero. The inner ring (22) of the second rolling bearing (20) protrudes further into the interior of the shaft bore (14) than the outer ring (24).

Figure 2K:
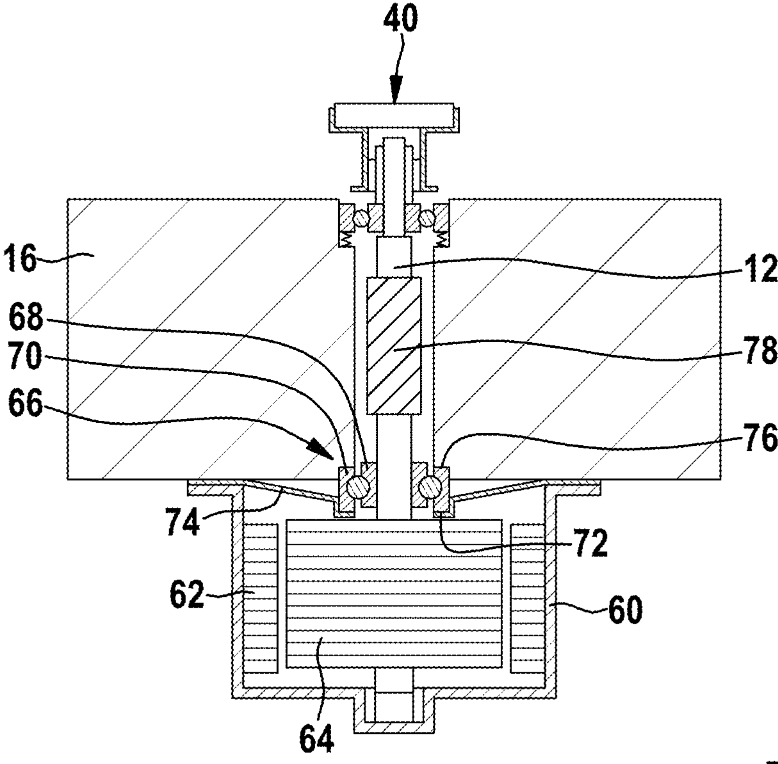

In the step illustrated in FIG. 2K, the pressing-on process of the signal transmitter (40) onto the fastening ring (52) is completed. The press-on tool (80) has been relieved and removed from the cup-shaped holder (42). This relieves the pretensioned spring element (34), which loads the outer ring (24) of the second rolling bearing (20). Consequently, the outer ring (24) of the second rolling bearing (20) moves within the associated bearing receptacle (30) in the direction of the opening of the shaft bore (14) and, while maintaining the existing mutual tensioning of the bearing rings, takes the associated inner ring (22) along with it.

Said inner ring is firmly clamped between the fastening ring (52) and the shaft shoulder (18) on the machine shaft (12), so that the axial movement of the outer ring (24) explained above is ultimately transmitted to the entire machine shaft (20).

Since the inner ring (68) of the first rolling bearing (66) arranged on the rotor side is, as explained, firmly pressed onto the machine shaft (12), this inner ring (68) also follows the axial movement of the machine shaft (12) and thus moves relative to the outer ring (70), which is also firmly accommodated in the bearing seats (72, 74).

This results in a bearing arrangement for the machine shaft (12) in which the bearing rings (22, 24; 68, 70) of both rolling bearings (20; 66) are braced against each other. Such a braced bearing of a machine shaft (12) in a housing block (16) is characterized in particular by low operating noise and high wear resistance of a machine equipped with this installation unit (10).

Of course, changes or additions to the embodiment example described are possible without deviating from the basic idea of the present invention.

In this context, it should be noted that the present invention is not limited to use in vehicle braking systems, but can generally be implemented in any type of machine, motor or generator. While a motor is known to convert electrical power supplied to the stator (62) into a mechanical torque with which a load can be driven by the machine shaft (12) via the output element (78), a rotational movement imposed on the machine shaft (12) is used to generate electrical energy in the case of a generator.

The invention claimed is:

1. An installation assembly, comprising:

a rotationally drivable machine shaft;

at least one rolling bearing for rotatably bearing the machine shaft in a housing block, the rolling bearing including an inner ring bearing the machine shaft and an associated outer ring accommodated in a bearing receptacle of the housing block;

a signal transmitter of a position detection sensor system configured to detect an angle of rotation of the machine shaft, the signal transmitter having a cup-shaped holder and a transmitter element arranged on the cup-shaped holder; and a fastening ring inserted in an annular gap between an inner circumference of the cup-shaped holder and an outer circumference of the machine shaft, the fastening ring configured for rotationally and axially fixed anchoring of the signal transmitter to a front end of the machine shaft;

wherein an end of the fastening ring protrudes axially from the cup-shaped holder of the signal transmitter and the protruding end is axially supported on a side flank of the inner ring of the rolling bearing.

2. The installation assembly according to claim 1, wherein:

the bearing receptacle of the housing block forms a support shoulder lying opposite an opening of a shaft bore and on which a spring element is axially supported, and the spring element loads the outer ring of the rolling bearing with an axial force which is directed in an opposite direction to a supporting force with which the fastening ring is supported on the side flank of the inner ring of the rolling bearing.

3. The installation assembly according to claim 2, wherein the spring element is a wave spring washer.

4. The installation assembly according to claim 1, wherein the cup-shaped holder is a sleeve-shaped component, open on both sides, the cup-shaped holder being divided into a fixing portion at one front end and into a transmitter receptacle for a transmitter element at an opposite front end, and wherein the cup-shaped holder has a smaller inner diameter in a region of the fixing portion than in a region of the transmitter receptacle.

5. The installation assembly according to claim 4, wherein the transmitter element includes a magnet which abuts axially inside the cup-shaped holder at a transition from the transmitter receptacle to the fixing portion.

6. The installation assembly according to claim 2, wherein the inner ring of the rolling bearing is arranged with a clearance fit on the machine shaft, and the outer ring of the rolling bearing is accommodated with a clearance fit in the bearing receptacle of the housing block.

7. A method for producing an installation assembly, the method comprising the following steps:

providing a housing block having a shaft bore, a bearing receptacle, and an electric machine attached to the housing block having a machine shaft which protrudes into the shaft bore of the housing block;

installing an annular spring element in the bearing receptacle of the housing block until the spring element rests on a support shoulder formed on the housing block;

sliding a rolling bearing having an inner ring onto the machine shaft and inserting the rolling bearing into the bearing receptacle of the housing block until the rolling bearing rests against the spring element having a side flank of an outer ring;

joining a fastening ring onto the machine shaft, until the fastening ring is axially abutted with a leading end against the inner ring of the rolling bearing;

pressing a signal transmitter onto a circumference of the fastening ring by applying an axial force to the signal transmitter such that the fastening ring together with the rolling bearing is shifted along the machine shaft and the spring element is axially pretensioned and until the rolling bearing abuts against a shaft shoulder formed on the machine shaft; and shifting the signal transmitter relative to the fastening ring into an end position in which maximum overlap of the signal transmitter with the fastening ring is achieved, and the fastening ring is supported on the inner ring of the rolling bearing by an end protruding from the cup-shaped holder of the signal transmitter.

8. An electronically commutated motor for a controllable drive of a brake pressure generator of an electronically slip-controllable brake system of a motor vehicle, the electronically commutated motor comprising:

an installation assembly, including:

a rotationally drivable machine shaft, at least one rolling bearing for rotatably bearing the machine shaft in a housing block, the rolling bearing including an inner ring bearing the machine shaft and an associated outer ring accommodated in a bearing receptacle of the housing block, a signal transmitter of a position detection sensor system configured to detect an angle of rotation of the machine shaft, the signal transmitter having a cup-shaped holder and a transmitter element arranged on the cup-shaped holder; and a fastening ring inserted in an annular gap between an inner circumference of the cup-shaped holder and an outer circumference of the machine shaft, the fastening ring configured for rotationally and axially fixed anchoring of the signal transmitter to a front end of the machine shaft, wherein an end of the fastening ring protrudes axially from the cup-shaped holder of the signal transmitter and the protruding end is axially supported on a side flank of the inner ring of the rolling bearing.

* * * * *